US012752449B2

(12) United States Patent
Chrysanthakopoulos

(10) Patent No.: US 12,752,449 B2
(45) Date of Patent: Oct. 6, 2026

(54) SKIN CONTACTING MEMBERS AND SHAVING RAZOR ASSEMBLIES

(71) Applicant: BIC Violex Single Member S.A., Anoixi (GR)

(72) Inventor: Nikolaos Chrysanthakopoulos, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 199 days.

(21) Appl. No.: 18/682,363

(22) PCT Filed: Jul. 25, 2022

(86) PCT No.: PCT/EP2022/070804
§ 371 (c)(1),
(2) Date: Feb. 8, 2024

(87) PCT Pub. No.: WO2023/016789
PCT Pub. Date: Feb. 16, 2023

(65) Prior Publication Data

US 2024/0342937 A1 Oct. 17, 2024

(30) Foreign Application Priority Data

Aug. 13, 2021 (EP) .................................... 21191333

(51) Int. Cl.
*B26B 21/44* (2006.01)
*B26B 21/40* (2006.01)

(52) U.S. Cl.
CPC ............ *B26B 21/443* (2013.01); *B26B 21/40* (2013.01); *B26B 21/4012* (2013.01);
(Continued)

(58) Field of Classification Search
CPC ............ A45D 26/0042; A45D 26/0047; A45D 27/38; B26B 21/44; B26B 21/443;
(Continued)

(56) References Cited

U.S. PATENT DOCUMENTS 5,903,979 A 5/1999 Oldroyd
6,406,207 B1 * 6/2002 Wiegner ............ B05B 11/1067 401/187

(Continued)

FOREIGN PATENT DOCUMENTS

EP 0808233 B1 12/1998
EP 1053838 B1 3/2003

(Continued)

OTHER PUBLICATIONS

Babaee, S., Pajovic, S., Rafsanjani, A. et al. Bioinspired kirigami metasurfaces as assistive shoe grips. Nat Biomed Eng 4, 778-786 (2020). https://doi.org/10.1038/s41551-020-0564-3.

(Continued)

*Primary Examiner* — Boyer D Ashley
*Assistant Examiner* — Haleigh N Watson
(74) *Attorney, Agent, or Firm* — Bookoff McAndrews, PLLC

(57) ABSTRACT

A skin contacting member for a razor assembly that comprises a main body having a plurality of lubricant reservoir cavities and a plurality of tiltable lid elements that at least partially cover one or more of the lubricant reservoir cavities is disclosed. Each tiltable lid element has a tilt axis which divides the tiltable lid element into a first portion and into a second portion. The first portion is arranged on a first side of the tilt axis while the second portion on a second side of the tilt axis. Each tiltable lid element is configured as a scale such that upon external force being exerted on a tiltable lid element during a shaving operation, a torque moment acts on (Continued)

A-A the tiltable lid element which tilts the first portion toward a respective lubricant reservoir cavity whereby the second portion is lifted up from the main body in an opposing direction.

18 Claims, 6 Drawing Sheets

(52) U.S. Cl.
CPC ...... *B26B 21/4018* (2013.01); *B26B 21/4031* (2013.01); *B26B 21/44* (2013.01)

(58) Field of Classification Search
CPC .................. B26B 21/446; B26B 21/40; B26B 21/4012; B26B 21/4018; B26B 21/4025; B26B 21/00; B26B 21/14; B26B 21/16; B26B 21/22; B26B 21/4031
USPC ................ 222/164, 527–529, 533; 30/47–51
See application file for complete search history.

(56) References Cited

U.S. PATENT DOCUMENTS

| | | | | |
|---|---|---|---|---|
| 8,061,566 | B2 * | 11/2011 | LaFlamme | A47K 7/03 222/207 |
| 2005/0120560 | A1 | 6/2005 | Franzini et al. | |
| 2005/0138814 | A1 * | 6/2005 | Pennella | B26B 21/446 30/41 |
| 2011/0146079 | A1 * | 6/2011 | Clarke | B26B 21/4012 30/34.05 |
| 2012/0023763 | A1 * | 2/2012 | Ariyanayagam | B26B 21/4018 30/537 |
| 2012/0102741 | A1 * | 5/2012 | Pesikov | B26B 21/44 30/41 |
| 2012/0324737 | A1 * | 12/2012 | Howell | B26B 21/4018 30/50 |
| 2015/0101195 | A1 * | 4/2015 | Long | B26B 21/4018 30/41.5 |
| 2015/0375410 | A1 * | 12/2015 | Wain | B26B 21/521 30/41 |
| 2018/0236677 | A1 * | 8/2018 | Blatter | B26B 21/44 |
| 2019/0375123 | A1 | 12/2019 | Park et al. | |

FOREIGN PATENT DOCUMENTS

| | | | |
|---|---|---|---|
| KR | 20140120071 | A | 10/2014 |
| WO | 9635558 | A1 | 11/1996 |
| WO | 0037227 | A1 | 6/2000 |
| WO | 03064122 | A1 | 8/2003 |
| WO | 2004096504 | A1 | 11/2004 |
| WO | 2006027018 | A1 | 3/2006 |
| WO | 2009142972 | A1 | 11/2009 |
| WO | 2011115782 | A1 | 9/2011 |
| WO | 2012018892 | A1 | 2/2012 |
| WO | 2013154287 | A1 | 10/2013 |
| WO | 2017172395 | A1 | 10/2017 |
| WO | 2017172396 | A1 | 10/2017 |

OTHER PUBLICATIONS

Search Report and Written Opinion issued in International Application No. PCT/EP2022/070804, mailed Oct. 20, 2022.

* cited by examiner

SKIN CONTACTING MEMBERS AND SHAVING RAZOR ASSEMBLIES

CROSS-REFERENCE TO RELATED APPLICATIONS

This is a National Stage Application under 35 U.S.C. § 371 of International Application No. PCT/EP2022/070804, filed Jul. 25, 2022, now published as WO 2023/016789 A1, which claims priority to European Patent Application No. 21191333.0, filed onAug. 13, 2021, its content being incorporated herein by reference.

TECHNICAL FIELD

This disclosure relates to shaving razor assemblies and razor cartridges. Specifically, the present disclosure relates to skin contacting members for shaving razor assemblies and for razor cartridges.

BACKGROUND

Razor cartridges (also known as safety razor cartridges) are usually attached to a shaving razor assembly including a razor handle. Razor cartridges typically comprise one or more cutting members, each including a blade, and being arranged between a leading longitudinal side and a trailing longitudinal side. In use, a user holds the razor handle and brings the razor cartridge into contact with a portion of skin. By movement of the razor cartridge in a shaving direction, unwanted hair is removed.

Depending on the area to be shaved, the skin of a user may have bumps or areas of curvature that create skin bulges. During a shave when the blade passes over the skin to cut the hair, it may contact elevated skin bulges and penetrate the stratum corneum or the epidermis resulting in shaving nicks and cuts and irritation. Also, most of the times hair follicles exit at junctions of skin cells. This way a part of a hair is at a skin furrow. Depending on the depth of the furrow, the efficient cut of a hair close to the skin becomes more difficult. For this reason, razor cartridges usually comprise means, for instance a guard bar which is arranged at a leading longitudinal side and configured to stretch and flatten the skin before the blades contact the skin.

At the same time, the blades and the razor cartridge need to have low friction with the hair and the skin so that the user achieves a comfortable shave. Usually, most of the razor cartridges have an area, for instance a skin contacting element, that is able to release lubricating material for reducing friction coefficient of the razor cartridge with the skin. Most of the times, this lubricating area is situated behind the blades, providing its effect on the skin and hair after the first shaving stroke on a specific area, thus limiting the lubrication efficiency.

It is desirable to improve the performance of razor cartridges to reduce nicks and cuts and at the same time to provide a more comfortable shave.

SUMMARY

The present disclosure relates to a skin contacting member according to claim 1, a razor cartridge according to claim 14 and a shaving razor assembly according to claim 15.

According to a first main aspect, a skin contacting member for a shaving razor assembly is provided. The skin contacting member comprises a main body and a plurality of tiltable lid elements. The main body has a plurality of lubricant reservoir cavities. The plurality of tiltable lid elements covers the plurality of lubricant reservoir cavities. Each tiltable lid element has a tilt axis which divides the tiltable lid element into a first portion on a first side of the tilt axis and into a second portion on a second side of the tilt axis which opposes the first side. Each tiltable lid element is configured as a scale. Each tiltable lid element is configured such that upon external force being exerted on it during a shaving operation, a torque moment acts on the tiltable lid element which tilts the first portion toward a respective lubricant reservoir cavity whereby the second portion is lifted up from the main body in an opposing direction. The scale configuration of the tiltable lid element can enhance the shaving performance during use of a razor cartridge and/or shaving razor assembly. This is possible because the first portion of the tiltable lid element may clear at least a portion of the cavity such that lubricant may be excreted, and the second portion lifts up from a surface plane of the skin contacting member and thereby can engage the skin to stretch it. Thereby a combination of dual function of the skin contacting member is provided which enables stretching and lubricating the skin at the same time during a shaving stroke. In comparison to uncovered cavities even when the user does not use the shaving razor assembly, leading to fast depleting or degradation of the lubricating material when the shaving razor assembly is left in a humid environment. In comparison to lubrication strips, where it is very difficult to integrate cosmetic elements, such as creams, oils and low viscosity materials, the cavities provide a larger variety of possible materials to be filled with.

In aspects, the tilt axis may be arranged substantially perpendicular to a shaving direction S. In aspects, the tilt axis may be arranged at a leading wall of a respective lubricant reservoir cavity. Alternatively described, the tilt axis may be arranged and configured to pass through, for example, the leading wall.

In aspects, each lubricant reservoir cavity may be configured and arranged below a respective first portion of a respective lid element. Specifically, only the first portion may be at least partially submersible into a corresponding lubricant reservoir cavity.

In aspects, each lubricant reservoir cavity may be filled with lubricant. Alternatively or additionally, each lubricant reservoir cavity may be filled with a cosmetic. The lubricant may be excretable when a respective tiltable lid element at least partially submerges into the lubricant reservoir cavity and thereby at least partially uncovers the respective lubricant reservoir cavity. In aspects, the lubricant is selected from the group consisting of shaving gel, vitamins, botanical extracts, salts, humectants, fragrances, essential oils, silicon oils, organic oils, waxes, antioxidants, exfoliants, depilatory agents, surfactants, hair and skin conditioning agents, antibacterial agents, anti-microbial, anti-irritants, antiseptics, biocides, preservatives, skin cooling and soothing agents, moisturizing and hydrating agents, skin protectants, colorants and combinations thereof. In general, the cavities may carry lubricating or cosmetic material. In aspects, the skin contacting member may comprise a lubricating or cosmetic material reservoir. The reservoir may be in a volume closer to a trailing area. The reservoir may be fluidically connected to the lubricant reservoir cavities. In aspects, channels may be provided between the reservoir and the lubricant reservoir cavities which fluidically connect the reservoir to the lubricant reservoir cavities. Thereby, lubricating material and/or cosmetic material can flow from the reservoir to the cavities, for instance through the action of gravity as the user uses the shaving razor assembly and holds it in an upright position.

In aspects, the lubricating and/or cosmetic material can be in the form of a gel, a liquid, a cream, ointment, or solid.

In aspects, with respect to a shaving direction S, the first side of the tilt axis is a trailing side, and the second side of the tilt axis is a leading side. The first portion of the tiltable lid element may be a trailing portion and/or a lubricating portion. The second portion of the tiltable lid element may be a leading portion and/or skin stretching portion. In aspects, the lubricant reservoir cavities may be located at, specifically below the trailing portion of a tiltable lid element.

In aspects, each tiltable lid element may comprise a hook feature. The hook feature may be configured to engage and stretch a user's skin. The hook feature may extend away from the tiltable lid element. Specifically, the hook feature may extend away from the tiltable lid element in a direction opposite to the main body. In aspects, the hook feature may comprise a barb. In aspects, the hook feature may be arranged on the second portion of tiltable lid element. In aspects, the hook feature may be formed by the second portion. In aspects, the hook feature may comprise polyhedrons selected from the group consisting of pyramids, tetrahedrons, pentahedrons, hexahedrons, heptahedrons, octahedrons, and combinations thereof. In aspects, the hook feature, may be formed directly on the tiltable lid element. In aspects, the hook feature may be molded or may be glued on the tiltable lid element. In aspects, the hook feature may comprise a high friction material or may be made of a high friction material. Thereby, the engagement to the skin of the user can be improved. In aspects, the hook feature may comprise a pointy edge of a shape capable of engaging the skin. The hook feature may comprise a triangular, a concave and/or a convex shape to provide skin engagement and/or stretching. In aspects, the hook feature may have dimension of between substantially 1 mm and 10 mm.

In aspects, each tiltable lid element may comprise a bump feature. The bump feature may be configured to contact a user's skin without stretching it. The bump feature may extend away from the tiltable lid element. Specifically, the bump feature may extend away from the tiltable lid element in a direction opposite to the main body. In aspects, the bump feature may comprise a protrusion. In aspects, the bump feature may be shaped rounded. In aspects, the bump feature is arranged on the first portion of the tiltable lid element. In aspects, the bump feature may be formed by the first portion. In aspects, the bump feature may be formed directly on the tiltable lid element. In aspects, the bump feature may be molded or glued on the tiltable lid element. The bump feature may comprise a hemispherical, a pyramid, a wedge, a conical, an asymmetric, a triangular prism, a diamond, a polyhedron shape or portions thereof or combinations thereof. In aspects, the bump feature may have dimension of between substantially 1 mm and 10 mm.

In aspects, each tiltable lid element may be tiltable between a pre-biased initial position for covering the lubricant reservoir cavities and a second position for providing lubricant and skin stretching. In aspects, each tiltable lid element may be configured to return to the pre-biased initial position upon release of the external force. Each tiltable lid element may comprise a spring feature providing a rotation axis restoring force for returning the tiltable lid element to the pre-biased initial position. In aspects, the plurality of tiltable lid elements is produced by Kirigami technique to provide the spring feature.

In aspects, each tiltable lid element may be shaped rectangular, trapezoidal, oval, circular, polygonal, triangular or diamond shaped. In aspects, the plurality of tiltable lid elements may be arranged periodically, for instance in a pattern.

In aspects, each lubricant reservoir cavity is half-rectangular, half-trapezoidal, half-oval, half-circular, half-polygonal, half-triangular or half-diamond shaped.

In aspects, the plurality of lubricant reservoir cavities and the plurality of tiltable lid elements may be arranged in one or more rows extending perpendicular to a shaving direction S. Specifically, the plurality of lubricant reservoir cavities and the plurality of tiltable lid elements may be arranged in at least two parallel rows extending perpendicular to a shaving direction S and being offset by half of a tiltable lid element.

In aspects, the plurality of tiltable lid elements is formed of a sheet material, specifically by Kirigami technique. In aspects, the second portion may be bent to form the hook portion. Specifically, the second portion may be bent concavely to have at least one edge being upwardly directed away from the main body. In aspects, the first portion may be bent to form the bump portion. Specifically, the first portion may be bent convexly to have at least one edge being downwardly directed towards the main body.

According to a second main aspect, a razor cartridge is provided. The razor cartridge comprises a frame, one or more cutting members and at least one skin contacting member according to the first main aspect or any sub aspect. The frame has a leading longitudinal side and a trailing longitudinal side. The one or more cutting members are arranged between the leading longitudinal side and the trailing longitudinal side.

In aspects, the skin contacting member may be arranged between the leading longitudinal side and the one or more cutting members. Specifically, the skin contacting member may cover at least a portion of or a whole surface area of the razor cartridge between the leading longitudinal side and the one or more cutting members. Alternatively, the skin contacting member may be arranged on both or one of the lateral sides of the one or more cutting members. In aspects, the skin contacting member may be arranged between the between the trailing longitudinal side and the one or more cutting members.

According to a third main aspect, a shaving razor assembly is provided. The shaving razor assembly comprises a razor handle and the razor cartridge according to the second main aspect or any sub aspect. The razor cartridge is either releasably attached to the razor handle via a pivotable or non-pivotable connection, integrally formed with the razor handle via a non-pivotable connection, or integrally formed with the razor handle via a pivotable connection.

According to the present disclosure the shaving performance can be enhanced by a combination of dual function tiltable lid elements and associated cavities at the skin contacting member that can stretch and lube the skin at the same time. For instance, the skin contacting member is designed to have a plurality of rotatable scale elements, i.e. the tiltable lids. Each scale element may comprise on its top, a hook element on the front or leading side (to the shaving direction), a bump element on the rear or trailing side (against the shaving direction) and a rotation or tilt axis at the middle. Each bump element covers as a lid a cavity of the skin contacting member which is filled with lubricating or cosmetic material. When the shaving razor assembly with the skin contacting member is not used, the scale elements are at rest and cover the lubricant cavities not permitting the lubricant to leak. As a user presses the shaving razor assembly on the skin to shave, the perpendicular skin force presses the bump element, forcing the scale element to rotate along its axis and the hook element to lift. During a shaving stroke, as the razor cartridge slides over the skin, the lifted hooks engage softly to and stretch the skin. At the same time, cavities under the submerged bump elements excrete lubricating or cosmetic material on the skin reducing friction. Once the user lifts the shaver from his skin, the spring force of the rotation axis rotates the scale back to its rest position covering the lubricating cavities preventing leakage of material.

Following example steps of using the skin contacting member may be described. When the shaving razor assembly is at rest, the tiltable lid elements are substantially flat and that lid portion with the bump feature, i.e. the first portion of the tiltable lid element, covers a respective lubricant reservoir cavity. When shaving razor assembly is pressed on the skin to perform a shaving stroke, vertical pressure forces the bump feature to move downward into the cavity and further forces the tiltable lid element to rotate. As the tiltable lid element rotates, that lid portion which comprises the hook feature, i.e. the second portion of the tiltable lid element, is lifted and can engage softly the skin stretching it, as the user performs the shaving stroke. As the skin is stretched, it is flattened, revealing the hair follicles more and permitting the user to achieve a shave closer to the skin with less nick and cuts. When the bump feature moves downward into the cavity, the bump feature submerges at least partially into the lubricant reservoir cavity, thereby forcing lubricant to disperse on the skin. As the lubricant covers the skin, it reduces the coefficient of friction making shave more comfortable. When the user lifts shaving razor assembly from the skin, the tiltable lid element rotates back to its original position, covering the lubricant reservoir cavity and preventing or at least reducing leakage.

DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different Figures indicate like or similar features.

DETAILED DESCRIPTION

Hereinafter, a detailed description will be given of the present disclosure. The terms or words used in the description and the configurations of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

Figure 1A:
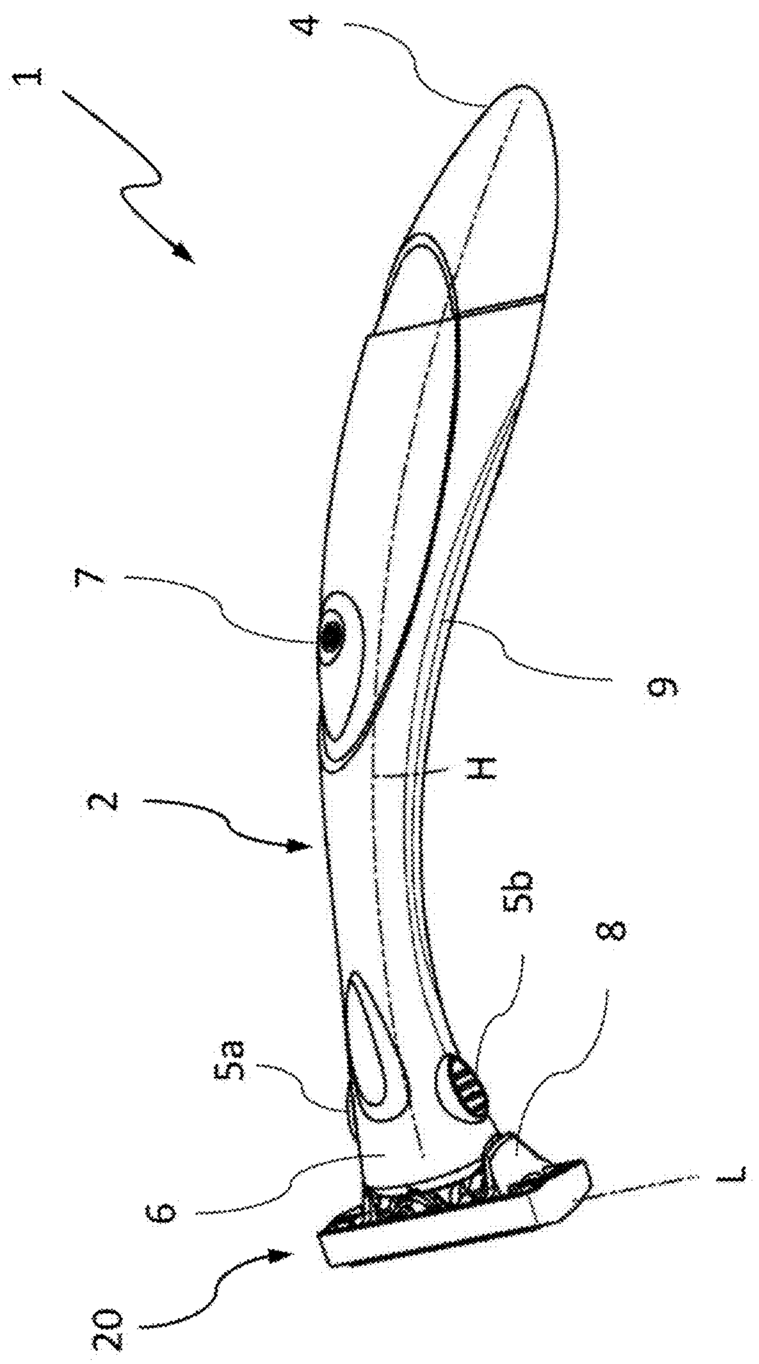
FIGS. 1*a* and 1*b* are perspective views of a shaving razor assembly.
Figure 1B:
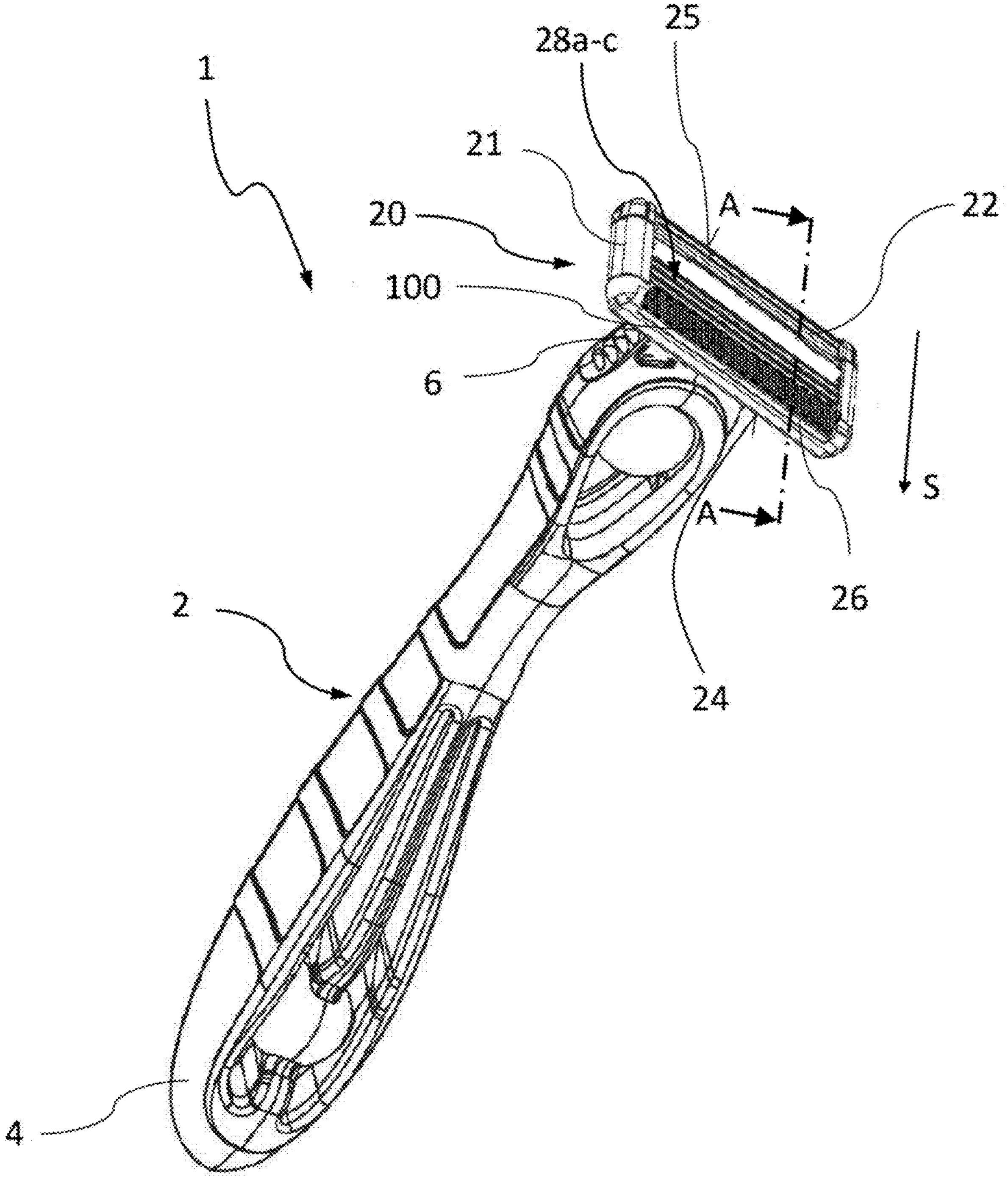

FIGS. 1*a* and 1*b* are perspective views of a shaving razor assembly 1 according to the present disclosure. The shaving razor assembly 1 comprises a handle 2 extending in a handle direction H between a proximal portion 4 and a distal portion 6 of the handle 2. A razor cartridge 20 is mounted at the distal portion 6 of the handle 2. The razor cartridge 20 will be presented in more detail following discussion of the shaving razor assembly 1.

The mounting of the razor cartridge 20 to the distal portion 6 of the handle 2 in the illustration is via a pivotable bearing member 8 enabling a frame of reference of the handle 2 to vary relative to a frame of reference of the razor cartridge 20, to thus enable the angle of the razor cartridge 20 against the skin of a user to vary and adapt to changes during use. In particular, the razor cartridge 20 pivots relative to the handle 2 about the longitudinal axis L of the razor cartridge 20, in use. The pivoting enables the user to adapt to contours of the body, for example. The longitudinal axis L of the razor cartridge 20 is substantially perpendicular to the shaving direction along the handle 2. Such a pivotable bearing member, in some embodiments, comprises two or more shell bearings configured to connect to the pivotable bearing member 8 of the handle 2, although a skilled person is familiar with many attachment mechanisms of a razor cartridge 20 to a handle which are not excluded. Another example of a connection mechanism for connecting the razor cartridge 20 to the handle 2 is discussed in WO2006/027018 A1. Another alternative is a razor cartridge 20 that may pivot relative to a second pivot axis (a rocking axis), substantially perpendicular to axis L.

In some embodiments, the pivotable bearing member 8 may be omitted (not illustrated) and the handle 2 provided as an integrally connected part of the support of the razor cartridge 20. In some embodiments, the pivotable bearing member 8 may further comprise, or be replaced by, a release mechanism 5*a*, 5*b*, enabling rapid release of an exhausted razor cartridge 20 from the handle 2. In some embodiments, the handle 2 and the support of the razor cartridge 20 are integrally formed with a pivotable bearing member (not illustrated) such as a plastic spring member. In some embodiments, the handle 2 is provided with a handle grip 9 formed of a rubber, or rubber-like material to improve gripping friction. In some embodiments, the handle 2 is provided with a thumb-rest 7 to enable a more secure grip of the handle 2 by a user.

With respect to FIG. 1*b* the razor cartridge 20 will be described in more detail. The razor cartridge 20 comprises a frame 21, wherein the frame 21 supports a group of cutting members 28*a-c* arranged between a trailing longitudinal side 25 and a leading longitudinal side 24 along a shaving direction S. The shaving direction S is depicted in FIG. 1*b* using arrow S. The presently disclosed razor cartridge 20 comprises a group of three cutting members 28*a*, 28*b*, 28*c*. In embodiments, the razor cartridge 20 may comprise more or less than three cutting members.

The razor cartridge 20 further comprises a skin care element 22 which is arranged in shaving direction S behind the cutting members 28*a-c*. This aspect can be seen even better in FIG. 2 which depicts a side cut view through a portion of a razor cartridge 20 along the line A: A of FIG. 1*b*. In other words, the skin care element 22 is arranged towards or at the trailing longitudinal side 25. Alternatively described the skin care element 22 may be arranged at a trailing longitudinal end (e.g. portion of frame 21 close to reference sign 25 in FIG. 1*b*) of the razor cartridge 20 or between the trailing longitudinal end and the cutting members 28*a-c*. The skin care element 22 may be configured as a lubricant strip. In embodiments, the skin care element 22 may be arranged elsewhere on the razor cartridge 20 and/or may be configured differently. In some embodiments, the skin care element 22 may be omitted.

In some embodiments, a guard member 26 is provided on the leading longitudinal side 24 of the razor cartridge 20 (see, FIG. 1*b*). In use, the guard member 26 is the first portion of the razor cartridge 20 to contact uncut hairs. The side of the razor cartridge 20 opposite to the leading longitudinal side 24 of the razor cartridge 20 and opposite to the shaving direction S is the trailing longitudinal side 25 of the razor cartridge 20. The trailing longitudinal side 25 is thus the final portion of the razor cartridge 20 to contact the skin.

Figure 2:
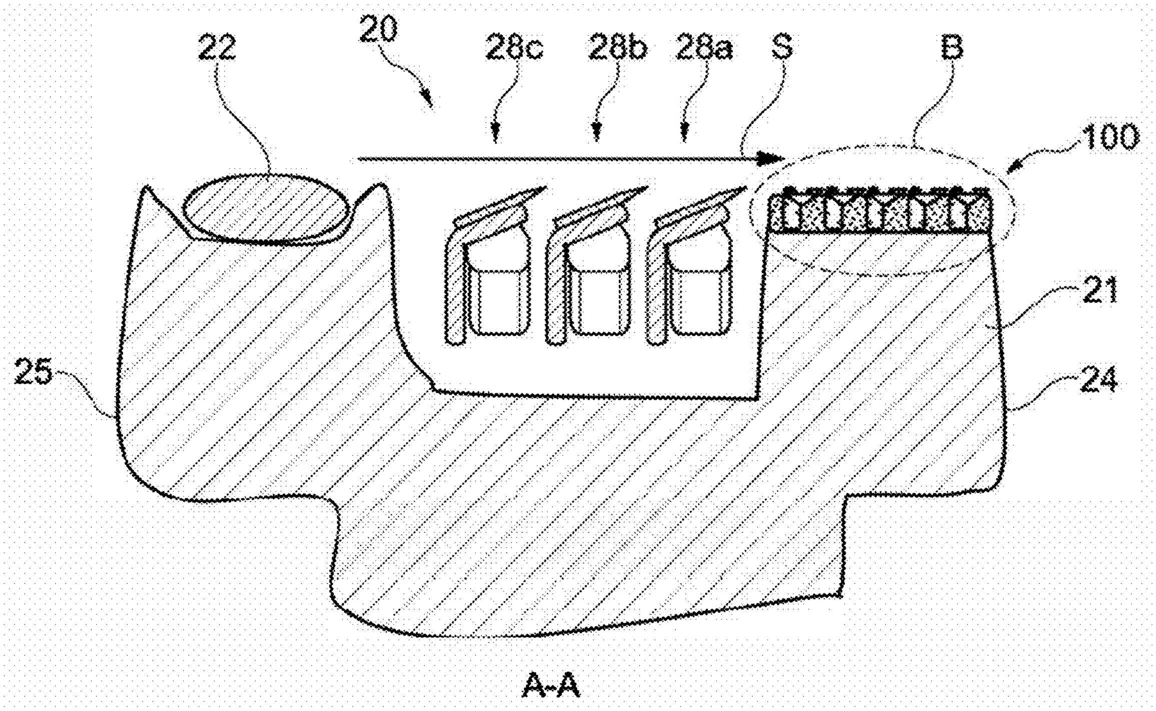
FIG. 2 schematically illustrates a side cut view through a portion of a razor cartridge along the line A: A of FIG. 1*b*.

The razor cartridge 20 further comprises a skin contacting member 100. As can be seen in FIGS. 1*b* and 2, the skin contacting member 100 is arranged between the leading longitudinal side 24 and the one or more cutting members 28*a-c*. Specifically, the skin contacting member 100 may cover a whole surface area of the razor cartridge 20 between the leading longitudinal side 24 and the one or more cutting members 28*a-c* (see, particularly FIG. 2). In embodiments, the skin contacting member 100 may only cover a portion of the frame 21 between the leading longitudinal side 24 and the one or more cutting members 28*a-c*. It may also be possible to provide two or more skin contacting members 100 on the razor cartridge 20. For instance, a skin contacting member 100 may be arranged on both or one of the lateral sides of the one or more cutting members 28*a-c* (not illustrated). In examples, a skin contacting member 100 may be arranged between the between the trailing longitudinal side 25 and the one or more cutting members 28*a-c*.

With respect to FIGS. 3*a*, 3*b* and 4, the skin contacting member 100 will be explained in further detail.

The skin contacting member 100 comprises a main body 102 and a plurality of tiltable lid elements 120. The main body 102 has a plurality of lubricant reservoir cavities 110. The plurality of tiltable lid elements 120 covers the plurality of lubricant reservoir cavities 110. In embodiments, only one or more or all of the plurality of lubricant reservoir cavities 110 may be covered at least partially. Each tiltable lid element 120 has a tilt axis 125 which divides the tiltable lid element 120 in a first portion 122 on a first side 125*a* of the tilt axis 125 and a second portion 126 on a second side 125*b* of the tilt axis 125 which opposes the first side 125*a* (see, FIG. 4). Each tiltable lid element 120 is configured as a scale. In the meaning of the present disclosure and claims, the tiltable lid element 120 may also be referred to as scale element. Alternatively described, being configured as a scale can mean that the tiltable lid element 120 is configured to perform a pivoting and/or rocking motion. That can be understood as the first portion 122 of the tiltable lid element 120 forming a first side or first lever of the scale, and the second portion 126 of the tiltable lid element 120 forming a second side or second lever of the scale. Each tiltable lid element 120 is configured such that upon external force being exerted on it during a shaving operation, a torque moment acts on the tiltable lid element 120 which tilts the first portion 122 toward a respective lubricant reservoir cavity 110 whereby the second portion 126 is lifted up from the main body 102 in an opposing direction. The scale configuration of the tiltable lid element 120 can enhance the shaving performance during use of the shaving razor assembly 1. This is possible because the first portion 122 of the tiltable lid element 120 may clear at least a portion of the cavity 110 such that lubricant may be excreted or pressed out (because the first portion 122 displaces a volume of the lubricant reservoir cavity 110), and the second portion lifts up from a surface plane of the skin contacting member 100 and thereby can engage the skin to stretch it. In that a combination of dual function of the skin contacting member 100 is provided which enables stretching and lubricating the skin at the same time during a shaving stroke. In comparison to uncovered cavities 110 when the user does not use the shaving razor assembly 1, the presently provided tiltable lid 120 for each cavity 110 can reduce fast depletion or degradation of the lubricating material when the shaving razor assembly 1 is left in a humid environment. In comparison to lubrication strips, where it is very difficult to integrate cosmetic elements, such as creams, oils and low viscosity materials, the cavities 110 provide a larger variety of possible materials to be filled with. The cavities 110 can be understood as some kind of recesses which have openings, whereby the openings, at least in an unused state, are at least partially covered by the tiltable lid elements 120.

The expression "skin contacting" member 100 can be understood as an element which at least partially comes into contact with the skin of a user of the razor cartridge 20 in normal use. Of course, many parts of the frame 21 and/or guard member 26 will also contact the skin of a user during normal use of the razor cartridge 20.

The tilt axis 125 is arranged substantially perpendicular to the shaving direction S and at a leading wall 116 of a respective lubricant reservoir cavity 110. Perpendicular to the shaving direction S is to be understood as still lying in the shaving plane. Alternatively described, tilt axis 125 is arranged substantially parallel to a cutting member 28*a-c*, specifically to a cutting edge of a cutting member 28*a-c*. A leading wall 116 can be understood as a wall of a lubricant reservoir cavity 110 restricting the respective lubricant reservoir cavity 110 towards the leading longitudinal side 24. Alternatively described a leading wall 116 is that wall of a lubricant reservoir cavity which is arranged most forward in shaving direction S. In other words, the tilt axis 125 passes through the leading wall 116. Alternatively described, the tilt axis 125 is arranged parallel to a cutting edge of one of the cutting members 28*a-c*. With respect to the shaving direction S, the first side 125*a* of the tilt axis 125 extends towards the trailing longitudinal side 25. The second side 125*b* of the tilt axis 125 extends towards the leading longitudinal side 24. That means, the first portion 122 of the tiltable lid element 120 is arranged on a trailing side with respect to the tilt axis 125 and may therefore be denoted a trailing portion of the tiltable lid element 120. The second portion 126 of the tiltable lid element 120 is arranged on a leading side with respect to the tilt axis 125 and may therefore be denoted leading portion of the tiltable lid element 120. Each lubricant reservoir cavity 110 is configured and arranged below a respective first portion 122 of a respective lid element 120. Specifically, only the first portion 122 may be at least partially submersible into a corresponding lubricant reservoir cavity 110. In this regard, the first portion 122 may also be referred to as a lubrication portion.

Figure 3A:
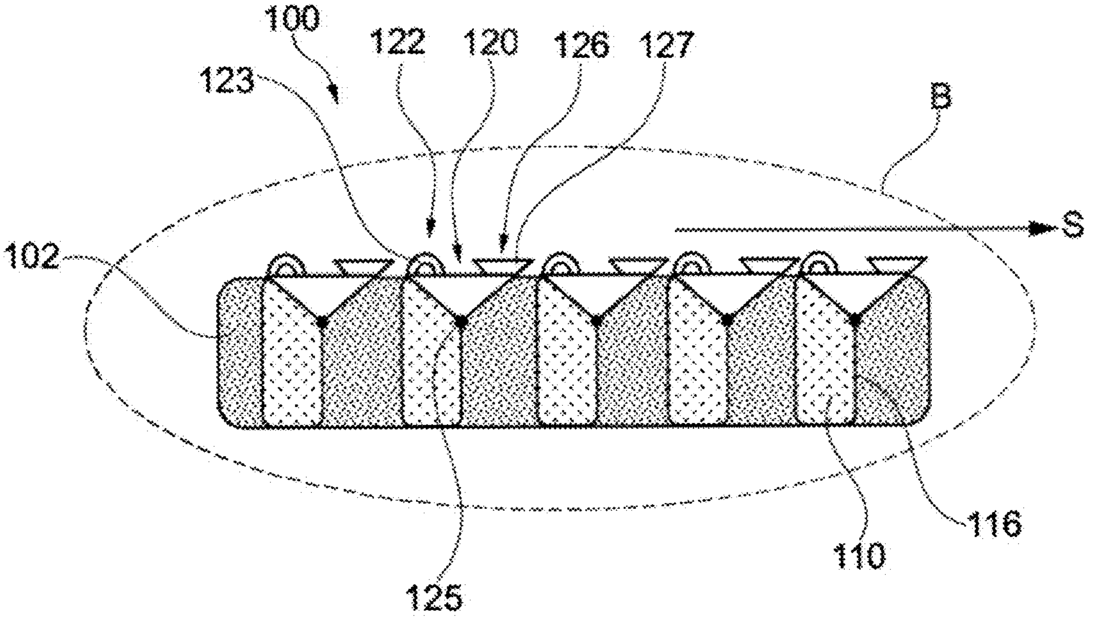
FIG. 3*a* is a schematic side cut view of the skin contacting member according to detail B of FIG. 2 before or after use.
Figure 3B:
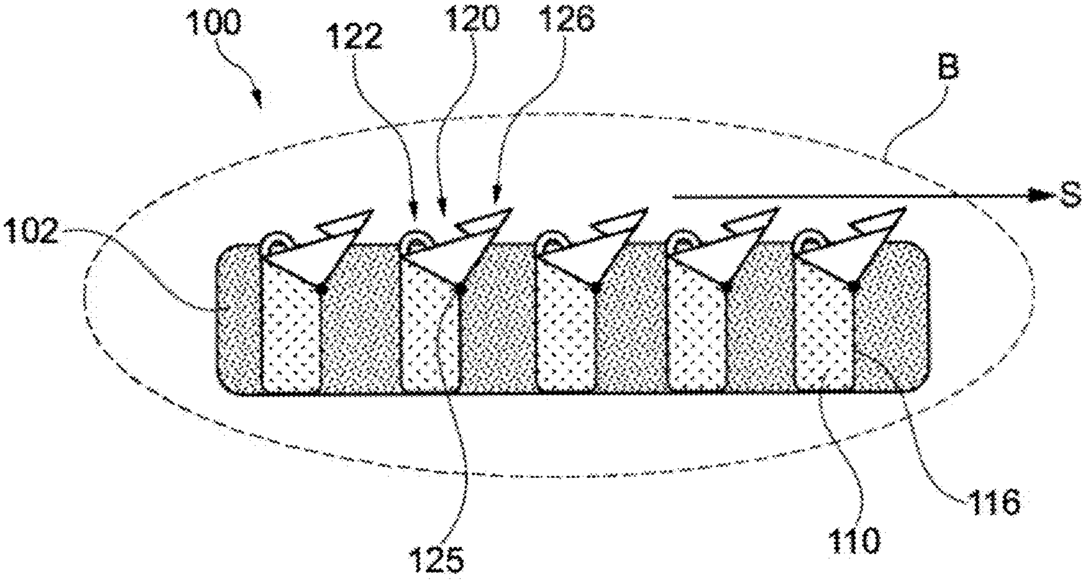
FIG. 3*b* is a schematic side cut view of the skin contacting member according to detail B of FIG. 2 during use.
Figure 4:
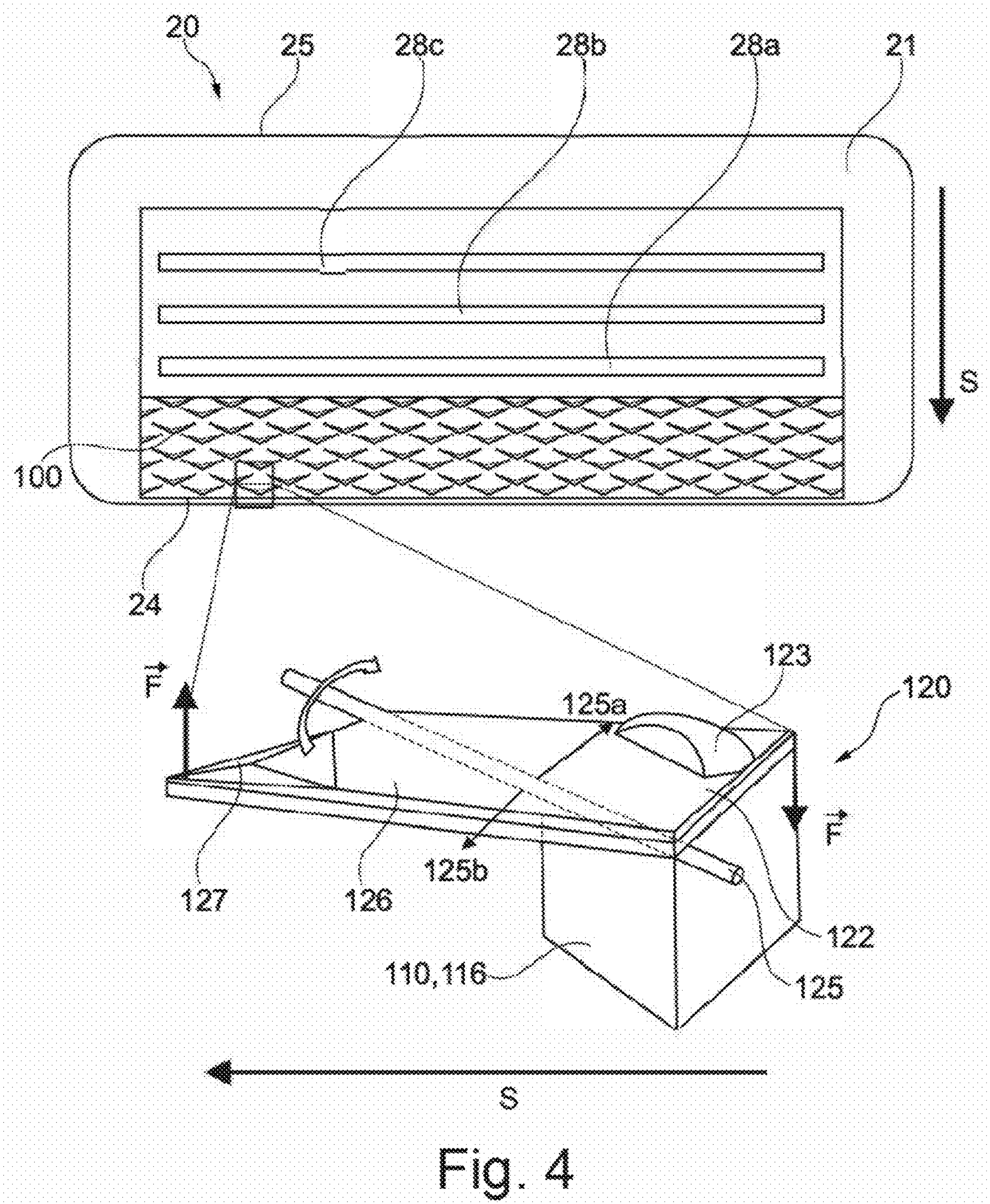
FIG. 4 is a schematic illustration in a bottom view of a razor cartridge comprising the skin contacting member between the cutting members and a leading side of a blade arrangement including a schematic detail of one exemplary unit of tiltable lid element with an associated cavity in a perspective view.

As can be seen in FIGS. 3*b* and 4, the second portion 126 moves in a counter direction (i.e. same rotational direction or rotational orientation) to the first portion 122. For instance, when the first portion 122 moves downwardly, i.e.

towards the main body 102, the second portion 126 moves upwardly, i.e. away from the main body 102. In use, "away from the main body 102" means towards the skin of user. Therefore, the second portion 126 may also be referred to as skin stretching portion. The movement direction of the second portion 126 is a result of configuring the tiltable lid element 120 as a scale. That means, when a force, for instance pressure of the skin, acts (orthogonally to the shaving direction S) on the skin contacting member 100, the first portion 122 is pressed towards the lubricant reservoir cavity 110 by a force F. This force F produces a torque on the skin contacting member 100 around the tilt axis 125 and thereby forces the second portion 126 upwardly by an opposing force F. The skilled person will understand that the forces F are merely here for illustrative purposes and do not necessarily mean that they are equal in their amounts, but that their amount or difference depends on various factors, for instance length of the lever and/or material of the tiltable lid element 120. In examples, the second portion 126 of the tiltable lid element 120 may be configured to be lifted up to 30° from a rest position upon exertion of external force. The first portion 122 of the tiltable lid element 120 may be configured to be submerged up to 30° from the rest position upon exertion of external force. In examples, an external force of the order of 0.5N to 5N may be sufficient to rotate the tiltable lid element 120 at least 30° about the tilt axis 125.

In embodiments (not shown), one or more or all tilt axes 125 may be arranged not perpendicular to a shaving direction S. For instance, one or more or all tilt axes 125 may inclined up to plus or minus 30 degrees with respect to an orthogonal of the shaving direction S. In other words, one or more or all tilt axes 125 may inclined up to plus or minus 30 degrees with respect an axis of a cutting member 28*a-c*. In embodiments, the design and/or arrangement of the lubricant reservoir cavities 110 may be varied. For instance, one or more or all lubricant reservoir cavities 110 may be located below the center of the respective tiltable lid element 120, closer towards the second portion 126 or closer towards the first portion 122. In an example, one or more or all lubricant reservoir cavities 110 may be arranged in the example of FIG. 3*a* further to the right in shaving direction S. This could exemplary be understood as "locating a lubricant reservoir cavity 110 closer towards the second portion 126".

In embodiments, one or more lubricant reservoir cavity 110 is filled with lubricant. In embodiments one or more or all of the plurality of lubricant reservoir cavities 110 may be filled with a cosmetic and/or a lubricant. The lubricant may be excretable when a respective tiltable lid element 120 at least partially submerges into the lubricant reservoir cavity 110 and thereby at least partially uncovers the respective lubricant reservoir cavity 110 (see, for instance FIG. 3*b*). When the shaving stroke is over, the tiltable lid element 120 rotates back and covers the respective lubricant reservoir cavity 110 again. In embodiments, the lubricant is selected from the group consisting of shaving gel, vitamins, botanical extracts, salts, humectants, fragrances, essential oils, silicon oils, organic oils, waxes, antioxidants, exfoliants, depilatory agents, surfactants, hair and skin conditioning agents, anti-bacterial agents, anti-microbial, anti-irritants, antiseptics, biocides, preservatives, skin cooling and soothing agents, moisturizing and hydrating agents, skin protectants, colorants and combinations thereof.

In some embodiments (not illustrated), the skin contacting member 100 may comprise a lubricating or cosmetic material reservoir. The reservoir may be in a portion of the main body 102 closer to a trailing side, for instance closer to the left in FIG. 3*a*. The reservoir may be fluidically connected to the lubricant reservoir cavities 110. In aspects, one or more channels may be provided between the reservoir and the lubricant reservoir cavities 110. The channels fluidically connect the reservoir to the lubricant reservoir cavities. Thereby, lubricating material and/or cosmetic material can flow from the reservoir to the cavities, for instance through the action of gravity as the user uses the shaving razor assembly and holds it in an upright position. In aspects, the lubricating and/or cosmetic material can be in the form of a gel, a liquid, a cream, ointment, or solid. For instance, in some embodiments one or more or all of the plurality of lubricant reservoir cavities 110 and/or the reservoir may be provided in the frame 21 of the razor cartridge 20.

To improve the functionality and the movement of the tiltable lid elements 120, each tiltable lid element 120 may comprise a bump feature 123 and a hook feature 127 which are schematically illustrated in FIGS. 3*a*, 3*b* and 4. The bump feature 123 and the hook feature 127 may form a respective portion of a surface of the skin contacting member 100.

In embodiments, the bump feature 123 is arranged on the first portion 122 and configured to contact a user's skin without stretching it. Thereby, a force of the skin, when guiding the shaving razor assembly 1 on the skin during use, can be received by the bump feature 123 and in that by the first portion 122 in order to tilt the skin contacting member 100. For that reason, the bump feature 123 may extend away from the tiltable lid element 120 in a direction opposite to the main body 102, i.e. upwards. In the example of FIGS. 3*a*, 3*b* and 4, the bump feature 123 is formed as a protrusion and shaped rounded. In that case, a stretching engagement with the skin can be prevented or at least reduced. That means, the skin can exert a force F in the direction of the arrow at the first portion in the detailed section of FIG. 4. At the same time the skin can slide relatively smoothly over the bump features 123. There are various ways to implement the bump feature 123 on the first portion 122. The bump portion 123 may be arranged on the first portion 122 of the tiltable lid element. In embodiments, the bump feature 123 may be formed by the first portion 122. In examples, the bump feature 123 may be molded or glued on the tiltable lid element 120. The bump feature 123 may comprise various shapes such as a hemispherical, a pyramid, a wedge, a conical, an asymmetric, a triangular prism, a diamond, a polyhedron shape, or portions thereof or combinations thereof. In examples, the bump feature 123 may have a dimension of between substantially 1 mm and 10 mm. The size of the bump feature 123 depends, inter alia, on the size of the razor cartridge 20, on the portion of the razor cartridge 20, which is covered by the skin contacting member 100, and for instance, on the sizes of the remaining elements of the skin contacting member 100.

In embodiments, the hook feature 127 is arranged on the second portion 126 and configured to engage and stretch a user's skin. The hook feature 127 extends away from the tiltable lid element 120 in a direction opposite to the main body 102. The hook feature 127 comprises a pointy edge or a pointy corner. The pointy edge or pointy corner is capable of engaging the skin. Thereby, the hook feature 127, and in that the skin contacting member 100, can exert a force on the skin when guiding the shaving razor assembly 1 on the skin during use. The pointy edge or pointy corner (also may be referred to as sharp edge or sharp corner) can engage with portions of the skin to stretch it. Many other shape or feature which are capable of engaging and stretching the skin may be implemented as hook feature 127. The hook feature 127 may be implemented in various, for instance including a barb. In examples, the hook feature 127 may be arranged on or formed by the second portion 126 of tiltable lid element 120. In some examples, the hook feature 127 may be molded or glued on the tiltable lid element. In some embodiments, the hook feature 127 may comprise a high friction material or may be made of a high friction material. Thereby, the engagement to the skin of the user can be improved. In the example of FIG. 4, the hook feature 127 comprises a triangular shape to provide skin engagement and stretching. In embodiments, the hook feature may comprise a different shape, for instance, a concave and/or a convex shape to provide skin engagement and/or stretching. In further examples, the hook feature, 127 may comprise polyhedrons selected from the group consisting of pyramids, tetrahedrons, pentahedrons, hexahedrons, heptahedrons, octahedrons, and combinations thereof as long as they provide skin engagement and stretching. In examples, the hook feature 127 may have a dimension of between substantially 1 mm and substantially 10 mm. The size of the hook feature 127 depends, inter alia, on the size of the razor cartridge 20, on the portion of the razor cartridge 20, which is covered by the skin contacting member 100, and for instance, on the sizes of the remaining elements of the skin contacting member 100.

In general, the material of the bump element 123 and the hook element 127 may be a hard plastic material, such as Acrylonitrile Butadiene Styrene (ABS), Polystyrene (PS), or Polypropylene (PP), an elastomer material, such as rubber, or silicon, or a metallic material, such as aluminum, or stainless steel. The bump element 123 and the hook element may be made of the same or of different materials. The skin contacting member 100, the main body 102 and/or the tiltable lid elements 120 may be made of one of the materials above. The main body 102 and the tiltable lid elements 120 may be formed of the same material or of different materials. The tiltable lid elements 120 may have a dimension of between substantially 5 mm and substantially 5 cm. A thickness of a tiltable lid element 120 may range from substantially 100 μm to substantially 1 mm.

FIGS. 3*a* and 3*b* show the skin contacting element 100 in a non-use state and a use state, respectively. In non-use state of FIG. 3*a*, each tiltable lid element 120 is in a rest position, specifically in a pre-biased initial position, also referred to as pre-biased rest position or first position. In this first position, the tiltable lid elements 120, specifically the respective first portions 122, cover the lubricant reservoir cavies 110. In use-state FIG. 3*b*, each tiltable lid element 120 is in a tilted position, specifically in a lubricant and/or skin stretching position or second position. In this second position, the tiltable lid elements 120, specifically the respective first portions 122, at least partially submerge and clear the lubricant reservoir cavities 110 to provide lubricant. Also in this second position, the tiltable lid elements 120, specifically the respective second portions 126, lift up, at least partially engage the skin, and provide skin stretching. Described in other words, each tiltable lid element 120 is tiltable between the pre-biased rest position and a second position for providing lubricant and skin stretching.

The skilled person will understand that not necessarily all of the tiltable lid elements 120 must always be in the second position at the same time during shaving. For instance, if the lateral force exerted from the skin on the bump feature is reduced or removed because contact is lost, for instance because the tiltable lid element 120 rotated by an amount where the first portion is submerged out of skin contact, single or several tiltable lid elements 120 may be rotated back to or at least towards the first position. Described in other words, each tiltable lid element 120 is configured to return to the pre-biased initial position upon release of the external force. Each tiltable lid element 120 comprises a spring feature providing a rotation axis restoring force for returning the tiltable lid element 120 to the pre-biased initial position.

The spring feature to provide the rotation axis restoring force may be implemented in various ways. In other words, the rotation axis restoring force may be implemented in various ways.

In embodiments, the tilt axis 125 of the tiltable lid element 120 may be formed elastic itself in order to be twisted elastically. Thereby, the spring feature can be provided. For instance, the tilt axis 125 may be made from a rubber material, or a soft plastic material. Thereby, the tiltable lid element 120 can be tilted whereas the tilt axis 125 is merely twisted when a shaving force is applied. Once the shaving force is removed the flat rest position can be restored. Thus, the elastic tilt axis 125 can provide the rotation axis restoring force.

In embodiments, a spring element may be provided as spring feature.

The spring element, specifically a vertical plastic or metallic element, is provided below the first portion 122 of the tiltable lid element 120. The spring element may be arranged orthogonally to the tilt axis 125. The spring element may therefore also be referred to as vertical spring element. In some examples, the spring element may be arranged between, particularly attached to at least one of, the first portion 122 and the main body 102. Specifically, the spring element may be arranged in lubricant reservoir cavity 110. The spring element is configured to compress when the first portion 122 is pressed and submerged into the cavity. Once the shaving force is relieved, the spring element expands and restores the first portion 122 to the rest position. The spring element may be configured as a compression spring. In some examples, the spring element may be arranged between, particularly attached to at least one of, the second portion 122 and the main body 102. In these examples the spring element may be configured as a tension spring.

In embodiments, the spring element, specifically a plastic elastic spring element, is provided in the lubricant reservoir cavity 110. More specifically, the spring element may span the lubricant reservoir cavity 110 between two of its side walls. Specifically, the spring element may be attached to at least one side wall of the lubricant reservoir cavity 110, for instance to the main body 102. In other words, the spring element may be arranged, for instance, parallel to the tilt axis 125. The spring element may therefore also be referred to as parallel spring element. When the first portion 122 is pressed and submerged into the lubricant reservoir cavity 110, the first portion 122 contacts and bends the spring element. Once the shaving force is relieved, the spring element straightens again and restores the first portion 122 to the rest position. The spring element may be configured similarly to movable blade plastic elastic finger elements of a razor cartridge 20.

In embodiments, the plurality of tiltable lid elements 120 may be produced by Kirigami technique to provide the spring feature. More specifically, the plurality of tiltable lid elements 120 may be formed of a sheet material by Kirigami technique. Kirigami technique can be understood as a type of cutting technique. Kirigami technique may be used in the sense that the sheet material is periodically precut over and under the tilt axis 125 of each tiltable lid element 120 in such a way that the surface is 2-Dimensional (planar) when no force is exerted on the tiltable lid element 120 and 3-Dimensional when force is exerted on one or more tiltable lid elements 120. In this regard, the tiltable lid elements 120 may also be referred to as Kirigami scale or Kirigami scale element. More information on Kirigami technique and function is described, for instance, by Babaee, S., Pajovic, S., Rafsanjani, A. et al. Bioinspired kirigami metasurfaces as assistive shoe grips. Nat Biomed Eng 4, 778-786 (2020), which is herein incorporated by reference. In some examples, the skin contacting member 100 is premanufactured as a sheet with precut and/or perforated tiltable lid elements 120 of a custom shape and then placed as an insert on the razor cartridge 20, specifically on the guard member 26, over the lubricant reservoir cavities 110 provided in the razor cartridge 20, specifically in the guard member 26. In some examples, the plurality of tiltable lid elements 120 is premanufactured as a sheet with precut and/or perforated tiltable lid elements 120 of a custom shape and then placed as an insert on the main body 102 over the lubricant reservoir cavities 110 provided in the main body 102 of the skin contacting member 100. In some examples, the plurality of tiltable lid elements 120 may be fabricated directly on the main body 102 or guard member 26 through molding or laser cutting. The bump feature 123 and/or hook feature 127 may be molded along with the tiltable lid elements 120 or may be glued to the tiltable lid elements 120. In some examples, the second portion 126 may be bent to form the hook portion 127. Specifically, the second portion 126 may be bent concavely to have at least one sharp edge or corner being upwardly directed away from the main body 102. In some examples, the first portion 122 may be bent to form the bump portion 127. Specifically, the first portion 122 may be bent convexly to have at least one edge being downwardly directed towards the main body 102. Thereby a rounded curve with downwardly directed edges may be provided. The lubricant reservoir cavities 110 may be molded with the main body 102 or may be manufactured separately and placed as an insert in the main body 102.

As depicted in FIG. 4, the plurality of tiltable lid elements 120 is arranged in several rows extending perpendicular to the shaving direction S. Analogously, the plurality of lubricant reservoir cavities 110 may be arranged in several rows extending perpendicular to the shaving direction S. In general, the plurality of lubricant reservoir cavities 110 and or the plurality of tiltable lid elements 120 may be arranged in one or more rows extending perpendicular to the shaving direction S. Specifically, and as depicted in FIG. 4. the plurality of lubricant reservoir cavities 110 and the plurality of tiltable lid elements 120 may be arranged in at least two parallel rows extending perpendicular to the shaving direction S and being offset by half of a tiltable lid element 120. In the present example, the plurality of tiltable lid elements 120 is arranged in a pattern, specifically in a periodic order, of diamond shapes. In examples, the plurality of tiltable lid elements 120 and/or the plurality of lubricant reservoir cavities 110 may be arranged in a periodic order (lines and columns and/or pattern) of the same shape such as but not limited a triangle, orthogonal, oval, disc, diamond, rectangular, trapezoidal, circular, polygonal, triangular, convex, concave. In examples, the plurality of tiltable lid elements 120 and/or the plurality of lubricant reservoir cavities 110 may be arranged in an asymmetric arrangement of different shapes per line and/or column. As the lubricant reservoir cavities 110 specifically are only arranged below the respective first portions 122, the shape of the lubricant reservoir cavities 110 may be a half-shape of the corresponding tiltable lid element 120. For instance, each lubricant reservoir cavity 110 may be shaped half-rectangular, half-trapezoidal, half-oval, half-circular, half-polygonal, half-triangular or half-diamond shaped. The lubricant reservoir cavities 110 may have dimensions, particularly openings, ranging from 1 mm to 10 mm. Specifically, the lubricant reservoir cavities 110 may have dimensions, particularly openings, substantially equal or slightly greater than the dimensions of the tiltable lid elements 120 lying over them. This allows the tiltable lid elements 120 to submerge into the respective lubricant reservoir cavity 110 and permits the lubricating and/or cosmetic material to exit and disperse on the skin.

Figure 5:
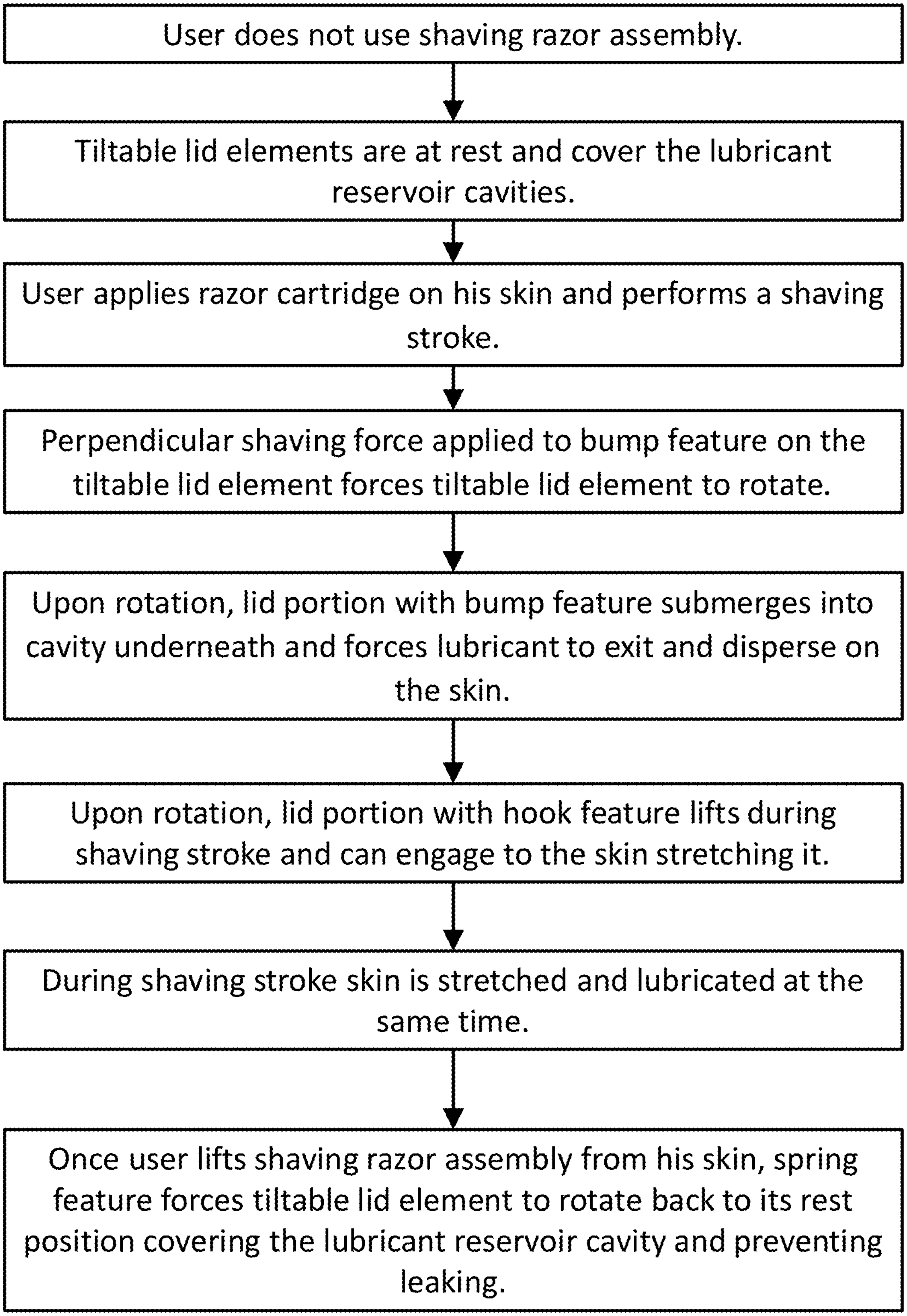
FIG. 5 depicts exemplary method steps of using the shaving razor assembly with the skin contacting member.

FIG. 5 depicts an exemplary use method of the skin contacting member 100 as described above. When a user does not use the shaving razor assembly 1, tiltable lid elements 120 are flat and the lubricant reservoir cavities 110. The user presses the razor cartridge 20 on his skin to perform a shaving stroke. Perpendicular shaving pressure, i.e. force, is applied on the bump feature 123 of a tiltable lid element 120 and forces the tiltable lid elements 120 to rotate along its tilt axis 125. The first portion 122 of the tiltable lid element 120 with the bump feature 123 submerges at least partially into the lubricant reservoir cavity 110. Under the pressure of the tiltable lid element 120 lubricating material is able to exit the lubricant reservoir cavity 110 and to disperse on the user's skin. The submerging first portion 122 may on the one hand clear a portion of the opening of the lubricant reservoir cavity 110, and on the other hand displace a portion of the volume inside the lubricant reservoir cavity 110 which is thereby forced out of the lubricant reservoir cavity 110. Upon rotation, the second portion 126 of the tiltable lid element 120 with the hook feature 127 is lifted towards the skin. During the shaving stroke sliding motion, the hook element 127 can grip the skin due to the high friction and stretch it. Thereby during shaving stroke, the skin is stretched and lubricated at the same time reducing nicks and cuts and at the same time providing a more comfortable shave. Once the shaving stroke ends, the user lifts the shaving razor assembly 1 from his skin. The tiltable lid element 120 returns to its initial rest position, due to rotation axis spring back force. The first portion 122 of the tiltable lid element 120 closes the lubricant reservoir cavity 110, preserving the lubricating or cosmetic material from leaking.

The following may be achieved by the presently disclosed features. During a shaving stroke, the hook features of the scale elements engage to the skin, stretch it and flatten it, to facilitate hair cutting, achieving a close and efficient shave and avoiding or at least reducing skin bulges minimizing the risk of nicks and cuts and shaving irritation. At the same time, the bump features submerge into the lubricant reservoir cavities permitting the dispersion of the lubrication and/or cosmetic material to the skin, before the blade cutting action, achieving low friction of the blades and shaving razor assembly with the hair and the skin, so that the user enjoys a comfortable and fluid shave. When the shaving razor assembly is not in use, the lubricant reservoir cavities are covered by the scale elements lying flat over them, preserving the lubricating/cosmetic material, thus making its action efficient and durable for more shaving uses. A cosmetic or a material with a lower viscosity can be used in the lubricant reservoir cavities, as it can be protected from oxidation, drying or degradation due to handling or the environmental effects on the shaver when not in use, as the scale elements serve as lids for the cavities.

It should be understood that the present disclosure can also (alternatively) be defined in accordance with the following configurations:

1. A skin contacting member (100) for a shaving razor assembly (1) comprising:
   a main body (102) having a plurality of lubricant reservoir cavities (110),
   and a plurality of tiltable lid elements (120) at least partially covering one or more of the plurality of lubricant reservoir cavities (110),
   wherein each tiltable lid element (120) has a tilt axis (125) which divides the tiltable lid element (120) in a first portion (122) on a first side (125*a*) of the tilt axis (125) and a second portion (126) on a second side (125*b*) of the tilt axis (125) which opposes the first side (125*a*), and
   wherein each tiltable lid element (120) is configured as a scale such that, upon external force being exerted on a tiltable lid element (120) during a shaving operation, a torque moment acts on the tiltable lid element (120) which tilts the first portion (122) toward a respective lubricant reservoir cavity (110) whereby the second portion (126) is lifted up from the main body (102) in an opposing direction.
2. The skin contacting member (100) of configuration 1, wherein the tilt axis (125) is arranged substantially perpendicular to a shaving direction S.
3. The skin contacting member (100) of any one of the preceding configurations, wherein the tilt axis (125) is arranged at a leading wall (116) of a respective lubricant reservoir cavity (110).
4. The skin contacting member (100) of any one of the preceding configurations, wherein each lubricant reservoir cavity (110) is configured and arranged below a respective first portion (122) of a respective lid element (120) such that only the first portion (122) is at least partially submersible into a corresponding lubricant reservoir cavity (110).
5. The skin contacting member (100) of any one of the preceding configurations, wherein each lubricant reservoir cavity (110) is filled with lubricant which is excretable when a respective tiltable lid element (120) at least partially submerges into the lubricant reservoir cavity (110) and thereby at least partially uncovers the respective lubricant reservoir cavity (110).
6. The skin contacting member (100) of configuration 5, wherein the lubricant is selected from the group consisting of shaving gel, fragrance, essential oils, vitamins, and combinations thereof.
7. The skin contacting member (100) of any one of the preceding configurations, wherein, with respect to a shaving direction S, the first side (125*a*) of the tilt axis (125) is a trailing side, and the second side (125*b*) of the tilt axis (125) is a leading side.
8. The skin contacting member (100) of any one of the preceding configurations, wherein each tiltable lid element (120) is shaped rectangular, trapezoidal, oval, circular, polygonal, triangular or diamond shaped.
9. The skin contacting member (100) of any one of the preceding configurations, wherein each lubricant reservoir cavity (110) is half-rectangular, half-trapezoidal, half-oval, half-circular, half-polygonal, half-triangular or half-diamond shaped.
10. The skin contacting member (100) of any one of the preceding configurations, wherein each tiltable lid element (120) comprises a hook feature (127) which is configured to engage and stretch a user's skin.
11. The skin contacting member (100) of configuration 10, wherein the hook feature (127) extends away from the tiltable lid element (120) in a direction opposite to the main body (102).
12. The skin contacting member (100) of any one of configurations 10 or 11, wherein the hook feature (127) comprises a barb.
13. The skin contacting member (100) of any one of configurations 10 to 12, wherein the hook feature (127) is arranged on the second portion (126) of the tiltable lid element (120) or is formed by the second portion (126).
14. The skin contacting member (100) of any one of configurations 10 to 13, wherein the hook feature (127) comprises polyhedrons selected from the group consisting of pyramids, tetrahedrons, pentahedrons, hexahedrons, heptahedrons, octahedrons, and combinations thereof.
15. The skin contacting member (100) of any one of the preceding configurations, wherein each tiltable lid element (120) comprises a bump feature (123) which is configured to contact a user's skin without stretching it.
16. The skin contacting member (100) of configuration 15, wherein the bump feature (123) extends away from the tiltable lid element (120) in a direction opposite to the main body (102).
17. The skin contacting member (100) of any one of configurations 15 or 16, wherein the bump feature (123) comprises a protrusion.
18. The skin contacting member (100) of any one of configurations 15 to 17, wherein the bump feature (123) is rounded.
19. The skin contacting member (100) of any one of configurations 15 to 18, wherein the bump feature (123) is arranged on the first portion (122) of the tiltable lid element (120) or is formed by the first portion (122).
20. The skin contacting member (100) of any one of the preceding configurations, wherein each tiltable lid element (120) is tiltable between a pre-biased initial position for covering the lubricant reservoir cavies (110) and a second position for providing lubricant and skin stretching.
21. The skin contacting member (100) of configuration 20, wherein each tiltable lid element (120) is configured to return to the pre-biased initial position upon release of the external force.
22. The skin contacting member (100) of configuration 21, wherein each tiltable lid element (120) comprises a spring feature providing a rotation axis restoring force for returning the tiltable lid element (120) to the pre-biased initial position.
23. The skin contacting member (100) of configuration 22, wherein each tiltable lid element (120) is produced by Kirigami technique to provide the spring feature.
24. The skin contacting member (100) of any one of the preceding configurations, wherein the plurality of lubricant reservoir cavities (110) and the plurality of tiltable lid elements (120) are arranged in one or more rows extending perpendicular to a shaving direction S.
25. The skin contacting member (100) of any one of the preceding configurations, wherein the plurality of lubricant reservoir cavities (110) and the plurality of tiltable lid elements (120) are arranged in at least two parallel rows extending perpendicular to a shaving direction S and being offset by half of a tiltable lid element (120).
26. The skin contacting member (100) of any one of the preceding configurations, wherein the plurality of tiltable lid elements (120) is formed of a sheet material, specifically by Kirigami technique.

27. The skin contacting member (100) of configuration 26, if at least dependent on configuration 10, wherein the second portion (126) is bent to form the hook portion (127).

28. The skin contacting member (100) of configuration 27, wherein the second portion (126) is bent concavely to have at least one edge being upwardly directed away from the main body (102).

29. The skin contacting member (100) of any one of configurations 26 to 28, if at least dependent on configuration 15, wherein the first portion (122) is bent to form the bump portion (127).

30. The skin contacting member (100) of configuration 29, wherein the first portion (122) is bent convexly to have at least one edge being downwardly directed towards the main body (102).

31. A razor cartridge (20) comprising:
   - a frame (21) having a leading longitudinal side (24) and a trailing longitudinal side (25);
   - one or more cutting members (28*a-c*) arranged between the leading longitudinal side (24) and the trailing longitudinal side (25); and
   - at least one skin contacting member (100) according to any one of the preceding configurations.

32. The razor cartridge (20) of configuration 31, wherein the skin contacting member (100) is arranged between the leading longitudinal side (24) and the one or more cutting members (28*a-c*).

33. A shaving razor assembly (1) comprising:
   - a razor handle (2); and
   - a razor cartridge (20) according to any one of configurations 31 or 32, wherein the razor cartridge (20) is either releasably attached to the razor handle (2) via a pivotable or non-pivotable connection (5*a*, 5*b*), integrally formed with the razor handle via a non-pivotable connection, or integrally formed with the razor handle (2) via a pivotable connection.

| Reference sign list | |
|---|---|
| H | razor handle direction |
| S | shaving direction |
| L | longitudinal axis/direction |
| 1 | Shaving razor assembly |
| 2 | handle |
| 4 | Proximal portion |
| 5a, 5b | release mechanism |
| 6 | Distal portion |
| 7 | thumb rest |
| 8 | pivotable bearing member |
| 9 | handle grips |
| 20 | razor cartridge |
| 21 | frame |
| 22 | Skin care element (e.g. lubricant strip) |
| 24 | leading longitudinal side |
| 25 | trailing longitudinal side |
| 26 | Guard member |
| 28a-c | cutting member |
| 100 | Skin contacting member |
| 102 | Main body |
| 110 | Lubricant reservoir cavities |
| 116 | Leading wall |
| 120 | Tiltable lid element |
| 122 | First portion of lid element |
| 123 | Bump feature |
| 125 | Tilt axis |
| 125a | First side of tilt axis |
| 125b | Second side of tilt axis |

-continued

| Reference sign list | |
|---|---|
| 126 | Second portion of lid element |
| 127 | Hook feature |

The invention claimed is:

1. A skin contacting member for a shaving razor assembly comprising:
   - a main body having a plurality of lubricant reservoir cavities,
   - and a plurality of tiltable lid elements at least partially covering one or more of the plurality of lubricant reservoir cavities,
   - wherein the tiltable lid element has a tilt axis which divides the tiltable lid element in a first portion on a first side of the tilt axis and a second portion on a second side of the tilt axis which opposes the first side, and
   - wherein the tiltable lid element is configured as a scale such that, upon external force being exerted on a tiltable lid element during a shaving operation, a torque moment acts on the tiltable lid element which tilts the first portion toward a respective lubricant reservoir cavity whereby the second portion is lifted up from the main body in an opposing direction.

2. The skin contacting member of claim 1, wherein the tilt axis is arranged at a leading wall of a respective lubricant reservoir cavity.

3. The skin contacting member of claim 1, wherein the lubricant reservoir cavity is filled with lubricant which is excretable when a respective tiltable lid element at least partially submerges into the lubricant reservoir cavity.

4. The skin contacting member of claim 1, wherein one or more tiltable lid element comprises a hook feature which is configured to engage and stretch a user's skin.

5. The skin contacting member of claim 4, wherein the hook feature extends away from the tiltable lid element in a direction opposite to the main body.

6. The skin contacting member of claim 1, wherein one or more tiltable lid element comprises a bump feature which is configured to contact a user's skin without stretching it.

7. The skin contacting member of claim 6, wherein the bump feature comprises a protrusion.

8. The skin contacting member of claim 1, wherein one or more tiltable lid element is tiltable between a pre-biased initial position for covering the lubricant reservoir cavities and a second position for providing lubricant and skin stretching.

9. The skin contacting member of claim 8, wherein one or more tiltable lid element is configured to return to the pre-biased initial position upon release of the external force.

10. The skin contacting member of claim 1, wherein two or more of the plurality of lubricant reservoir cavities and two or more of the plurality of tiltable lid elements are arranged in at least two parallel rows extending perpendicular to a shaving direction S and being offset by half of a tiltable lid element.

11. The skin contacting member of claim 1, wherein one or more of the plurality of tiltable lid elements is formed of a sheet material, specifically by a cutting technique.

12. A razor cartridge comprising:
   - a frame having a leading longitudinal side and a trailing longitudinal side;
   - one or more cutting members arranged between the leading longitudinal side and the trailing longitudinal side; and
   - at least one skin contacting member according to claim 1.

13. A shaving razor assembly comprising:

a razor handle; and a razor cartridge according to claim 12, wherein the razor cartridge is either releasably attached to the razor handle via a pivotable or non-pivotable connection, integrally formed with the razor handle via a non-pivotable connection, or integrally formed with the razor handle via a pivotable connection.

14. The skin contacting member of claim 1, wherein the first portion of the tiltable lid element includes a bump feature and the second portion of the tiltable lid element includes a hook feature.

15. The skin contacting member of claim 14, wherein, upon external force being exerted on the tiltable lid element during the shaving operation, the second portion is lifted up by 30 degrees with respect to the main body.

16. The skin contacting member of claim 15, wherein, upon external force being exerted on the tiltable lid element during the shaving operation, the first portion is configured to submerge at least partially into the lubricant reservoir cavity.

17. The skin contacting member of claim 1, wherein the tilt axis is arranged perpendicular to a shaving direction.

18. The skin contacting member of claim 17, wherein the tilt axis is elastic and configured to be twisted elastically when the tiltable lid element tilts.

* * * * *